United States Patent
Kim et al.

(10) Patent No.: US 9,381,950 B2
(45) Date of Patent: Jul. 5, 2016

(54) SHOCK ABSORBER HOUSING AND MOUNTING STRUCTURE THEREOF FOR VEHICLE

(71) Applicant: Hyundai Motor Company, Seoul (KR)

(72) Inventors: Hyunsik Kim, Seoul (KR); Sunju Lee, Incheon (KR); Joonam Kim, Yongin-si (KR); Seongsu Shin, Geoje-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/539,675

(22) Filed: Nov. 12, 2014

(65) Prior Publication Data

US 2015/0290989 A1    Oct. 15, 2015

(30) Foreign Application Priority Data

Apr. 15, 2014 (KR) ........................ 10-2014-0044915

(51) Int. Cl.
*B62D 7/22* (2006.01)
*B62D 25/08* (2006.01)

(52) U.S. Cl.
CPC ................................. *B62D 25/088* (2013.01)

(58) Field of Classification Search
CPC ....... B62D 21/15; B62D 21/152; B62D 23/00
USPC .............. 280/784; 293/132, 133; 296/187.09, 296/187.1, 187.12
See application file for complete search history.

(56) References Cited

U.S. PATENT DOCUMENTS

| | | | | |
|---|---|---|---|---|
| 4,272,114 A * | 6/1981 | Hirano | ....................... | F16F 7/12 188/377 |
| 6,174,009 B1 * | 1/2001 | McKeon | .................. | B60R 19/34 188/377 |
| 6,957,846 B2 * | 10/2005 | Saeki | .................... | B62D 21/152 180/232 |
| 7,380,829 B2 * | 6/2008 | Kishima | ............... | B62D 21/155 180/232 |
| 7,393,016 B2 * | 7/2008 | Mitsui | .................... | B62D 25/08 180/232 |
| 8,123,284 B2 * | 2/2012 | Hedderly | .............. | B62D 27/023 296/193.06 |
| 8,596,711 B2 * | 12/2013 | Yasui | ....................... | B60R 19/34 296/187.09 |
| 8,801,083 B2 * | 8/2014 | Miyashita | ............. | B62D 21/152 296/187.1 |
| 8,807,632 B2 * | 8/2014 | Ramoutar | ............... | B60R 19/24 293/132 |
| 9,027,695 B2 * | 5/2015 | Nakamura | ........... | B62D 21/155 180/247 |
| 9,061,713 B2 * | 6/2015 | Hashimoto | .......... | B62D 21/152 |
| 2003/0141712 A1 * | 7/2003 | Miyasaka | ............... | B60R 19/00 280/784 |
| 2004/0200659 A1 * | 10/2004 | Miyasaka | ............ | B62D 21/155 180/312 |

FOREIGN PATENT DOCUMENTS

| | | |
|---|---|---|
| KR | 1998-019878 A | 6/1998 |
| KR | 10-1316876 B1 | 10/2013 |
| KR | 10-1340454 B1 | 12/2013 |

\* cited by examiner

*Primary Examiner* — Toan To
(74) *Attorney, Agent, or Firm* — Morgan, Lewis & Bockius LLP

(57) ABSTRACT

A shock absorber housing of a vehicle may include a shock absorber housing body formed in a shape of a box and in which an upper portion of a shock absorber is mounted by being inserted therein, and flanges formed along at least one of edges of the box-shaped shock absorber housing body and thus being coupled to a vehicle body, in which the shock absorber housing body includes a low strength portion and a high strength portion respectively having different strengths due to a thickness difference.

16 Claims, 4 Drawing Sheets

SHOCK ABSORBER HOUSING AND MOUNTING STRUCTURE THEREOF FOR VEHICLE

CROSS-REFERENCE TO RELATED APPLICATION

The present application claims priority to Korean Patent Application No. 10-2014-0044915 filed Apr. 15, 2014, the entire contents of which is incorporated herein for all purposes by this reference.

BACKGROUND OF THE INVENTION

1. Field of the Invention

The present invention relates to a shock absorber housing for a vehicle. More particularly, the present invention relates to a shock absorber housing that can improve small overlap front crash response performance for a vehicle.

2. Description of Related Art

In general, a suspension system for a vehicle is an apparatus for connecting a vehicle axle and a vehicle body and preventing the vehicle body or freight from being damaged and improving ride comfort by controlling vibration or impact which the vehicle axle receives from a road during running not to be directly transmitted to the vehicle body, and is formed of a chassis spring that lessens impact from a road, a shock absorber that enhances riding comfort by controlling free vibration of the chassis spring, and a stabilizer suppressing rolling of the vehicle body.

While a lower portion of the shock absorber is typically connected to a wheel by a knuckle or the like, an upper portion of the shock absorber is mounted to the vehicle body, and mainly serves to absorb and reduce vibration and impact that is transmitted to the vehicle body through the wheel.

A front shock absorber mounted on a front wheel of the vehicle among the above-described shock absorbers has an upper portion which is typically connected to the vehicle body through a front shock absorber housing.

The front shock absorber housing is substantially formed in a shape of a quadrangular box, and flanges are integrally formed along box-shaped edges and the flange at one side is coupled to a front side member extended along a length direction of the vehicle.

In addition, the flange at the other side of the front shock absorber housing is coupled to a fender apron upper member extended along the length direction of the vehicle and provided further out than the front side member along a width direction of the vehicle such that the front shock absorber housing is connected with the vehicle body through the front side member and the fender apron upper member.

However, in such a conventional front shock absorber housing mounting structure, when a vehicle experiences offset-collision with another vehicle or an object (hereinafter referred to as a collision object) while traveling, in particular, when the vehicle experiences a small overlap collision and thus an overlapped portion with the collision object at an outer portion along the width direction of the vehicle is small, the collision object hits not only front wheels but also the front shock absorber and the front shock absorber housing. In this case, when the front shock absorber housing is too thin, the front shock absorber housing absorbs impact energy transmitted from the collision object while being deformed due to the impact energy, but after collision with the collision object, the front shock absorber housing cannot induce width-directional movement of the vehicle (the vehicle turns aside with respect to the collision object to avoid continuous front collision with the collision object) so that performance of the vehicle responding to small overlap front collision of the vehicle cannot be improved.

Meanwhile, when the front shock absorber housing is too thick and thus has high strength, strength of a coupling portion between the front shock absorber housing and the front side member is lower than the strength of the front shock absorber housing itself. In this case, the front shock absorber housing is torn out and then lifted along the height direction of the vehicle before the front shock absorber housing is deformed while receiving impact energy from the collision object so that the front shock absorber housing cannot sufficiently perform impact absorbing performance, thereby causing weakening performance in response to a front collision of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention has been made in an effort to provide a shock absorber housing that can absorb impact energy by being properly deformed while receiving the impact energy from a collision object when a small overlap front collision occurs and thus the collision object hits the vehicle, and after the collision, rigidly withstanding the collision to avoid continuous front collision by inducing with-directional movement of the vehicle, thereby improving performance in response to a front collision of the vehicle, and a mounting structure thereof.

According to various aspects of the present invention, a shock absorber housing of a vehicle may include a shock absorber housing body formed in a shape of a box and to which an upper portion of a shock absorber is mounted by being inserted therein, and flanges formed along at least one of edges of the box-shaped shock absorber housing body and coupled to a vehicle body, in which the shock absorber housing body may include a low strength portion and a high strength portion that have different strengths due to a thickness difference.

The low strength portion may be provided in an outer side of the vehicle in a width direction thereof with respect to the high strength portion.

The low strength portion and the high strength portion may be respectively formed in a shape of a quadrangle or a triangle.

A thickness of the high strength portion may be 2.5 times to 3.5 times a thickness of the low strength portion.

The low strength portion and the high strength portion may be connected to each other through an intermediate connection portion having variable strength along a width direction thereof.

The intermediate connection portion may have variable thickness between a thickness of the low strength portion and a thickness of the high strength portion.

The intermediate connection portion may be formed in a shape of an oblique line.

An inclination angle of the oblique line may be between 55° and 65'.

The oblique line may be inclined to an outer side of the vehicle along the width direction of the vehicle.

The shock absorber housing body may be formed of an aluminum material using a high-vacuum die-casting method.

A shock absorber housing mounting structure of a vehicle, in which one portion of the above-mentioned shock absorber housing may be coupled to a front side member extended along a length direction of the vehicle, and another portion of the shock absorber housing may be extended along the length direction of the vehicle, and may be provided at an outer side along a width direction of the vehicle with respect to the front side member and may be coupled to a fender apron upper member provided higher than the front side member with respect to a height direction of the vehicle.

The shock absorber housing of the vehicle and the mounting structure thereof according to various aspects of the present invention is provided with a shock absorber housing body substantially formed in the shape of a quadrangle box and flanges integrally extended along edges of the quadrangle box and coupled with other portions of the vehicle body, and the low strength portion and the high strength portion are partitioned through the intermediate connection portion in the shock absorber housing body. Thus, when a collision object hits the vehicle, the low strength portion receives impact energy from the collision object and absorbs the impact energy by being properly deformed such that the impact energy can be effectively reduced.

In addition, when the collision is continued, the high strength portion rigidly withstands the collision while resisting the hit of the collision object after the deformation of the low strength portion is completed, and accordingly, the vehicle moves in a direction that avoid the continuous collision with the collision object so that performance in response to a front collision of the vehicle can be improved, damage to the vehicle body and mounted parts of the vehicle body can be reduced, and a passenger can be more safely protected.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
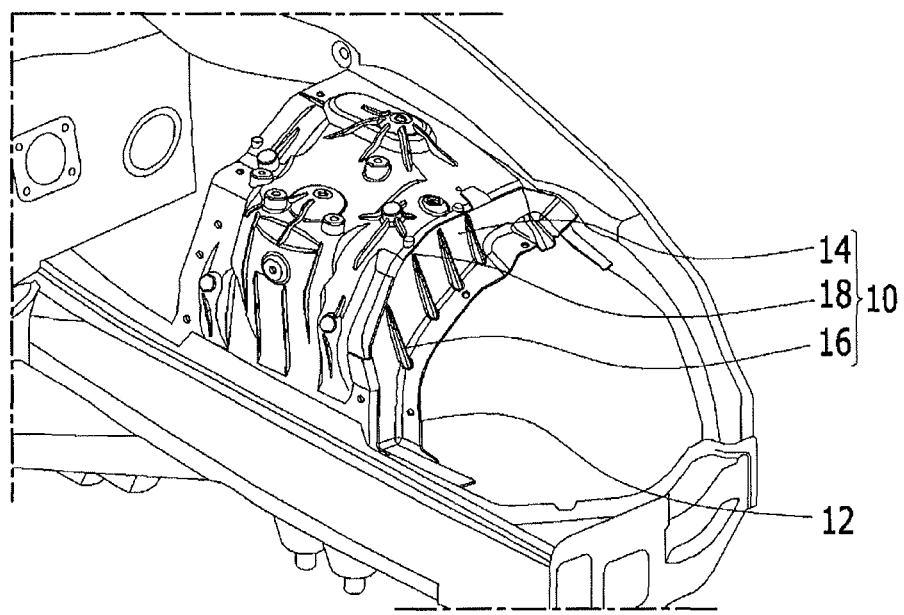
FIG. 1 is a perspective view illustrating a state in which an exemplary shock absorber housing for a vehicle according to the present invention is mounted to a vehicle body.
Figure 2:
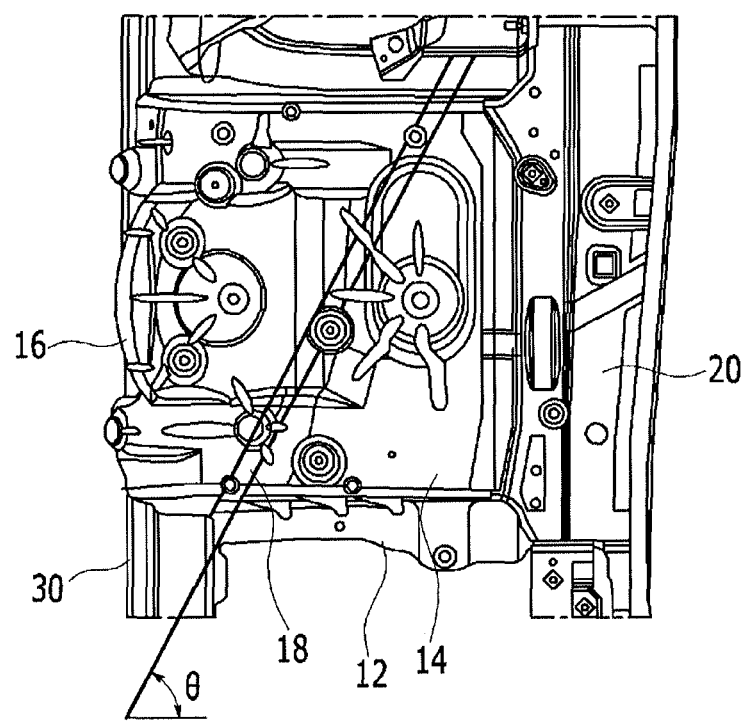
FIG. 2 is a top plan view of the exemplary vehicle shock absorber housing according to the present invention.

Referring to FIG. 1 and FIG. 2, a vehicle shock absorber according to various embodiments of the present invention may include a shock absorber housing body 10 substantially formed in the shape of a square box and made of a panel.

A flange 12 extended along an edge of the square box shape of the housing body 10 may be formed by being integrally bent from the housing body 10.

The flange 12 is used in connection of the shock absorber housing body 10 to a vehicle body using a method such as bolding, riveting, or welding.

For example, the housing body 10 may be disposed between a front side member 20 extended along a length direction of the vehicle and a fender apron upper member 30 disposed at an outer edge of the front side member 20 along a width direction of the vehicle and disposed further up than the front side member 20 in the height direction of the vehicle such that the housing body 10 may be coupled by being bonded or engaged to the front side member 20 and the fender apron upper member 30.

The housing body 10 may include a low strength portion 14 having low strength due to a relatively thin thickness, a high strength portion 16 having relatively high strength due to a relatively thick thickness, and an intermediate connection portion 18 connecting the low strength portion 14 and the high strength portion 16 and having a variable thickness.

The low strength portion 14 may have a thickness of, for example, 1.5 mm±0.2 mm.

The high strength portion 16 may have a thickness of about 4.5 mm±0.2 mm.

That is, a conventional shock absorber housing has a thickness of 3.0 mm, but the thickness of the low strength portion 14 is reduced to half of the thickness of a low strength portion of the conventional shock absorber housing, and when the reduced thickness of the low strength portion 14 is added to the thick thickness of the high strength portion 16, the average thickness and the weight of the housing body 10 according to various embodiments of the present invention may be the same as those of the conventional shock absorber housing having the uniform thickness.

Accordingly, the thickness of the high strength portion 16 is 3.0 times the thickness of the low strength portion 14, but the thickness of the high strength portion 16 may be 2.5 to 3.5 times the thickness of the low strength portion 14 by adjusting the thickness of the low strength portion 14 and the thickness of the high strength portion 16.

The intermediate connection portion 18 may have a width of, for example, 15 mm±2.0 mm.

The intermediate connection portion 18 may have a variable thickness that is gradually increased from the low strength portion 14 toward the high strength portion 16.

The intermediate connection portion 18 may have the minimum thickness of the low strength portion 14 and the maximum thickness of the high strength portion 16.

As described above, when a collision object strikes the housing body 10, abnormal movement and deformation of the housing body 10 that may occur due to a rapid thickness variation between the low strength portion 14 and the high strength portion 16 can be prevented by forming the intermediate connection portion 18 between the low strength portion 14 and the high strength portion 16.

The low strength portion 14 may be provided at an outer edge along a width direction of the vehicle with respect to the high strength portion 16.

The low strength portion 14 and the high strength portion 16 may be respectively formed in the shape of a square and a triangle.

The intermediate connection portion 18 may be formed to separate between the low strength portion 14 and the high strength portion 18.

The intermediate connection portion 18 may be inclined in the shape of a diagonal line from one end to the other end of the low strength portion 14 or the high strength portion 16.

In the various embodiments, the intermediate connection portion 18 may be formed as a diagonal line, but may be formed in the shape of an arc or a curved line.

The intermediate connection portion 18 may be formed in the shape of a diagonal line while forming an inclination angle θ of preferably 55° to 60°.

When the inclination angle θ is greater than 55°, a ratio of the low strength portion 14 in the housing body 10 is excessively increased so that the entire strength of the housing body 10 is decreased, and accordingly, shock absorber input point strength is also decreased, thereby deteriorating support performance of the suspension system. Further, a movement range in the width direction of the vehicle is decreased when a small overlap front collision occurs, and thus performance in response to a small overlap front collision of the vehicle is weakened, and this will be described later.

When the inclination angle θ is less than 55°, the ratio of the high strength portion 16 in the housing body 10 is excessively increased and thus the entire weight of the housing body 10 is increased, and such a weight increase becomes disadvantageous to fuel efficiency of the vehicle. In addition, when a small overlap front collision of the vehicle occurs, the strength of the absorber housing is excessively increased and thus the shock absorber is deformed due to impact transmitted from the collision object. Then, the coupling portion between the shock absorber and the front side member 20 is broken first before the shock absorber housing absorbs impact energy, and performance of the vehicle in response to a small overlap front collision of the vehicle is weakened.

In addition, the intermediate connection portion 18 may be inclined toward an outer edge along the width direction of the vehicle with respect to the coupling point between the front side member 20 and the housing body 10.

The shock absorbing housing according to various embodiments of the present invention can be made of an aluminum material and manufactured by using a high-vacuum die-casting method.

Figure 3:
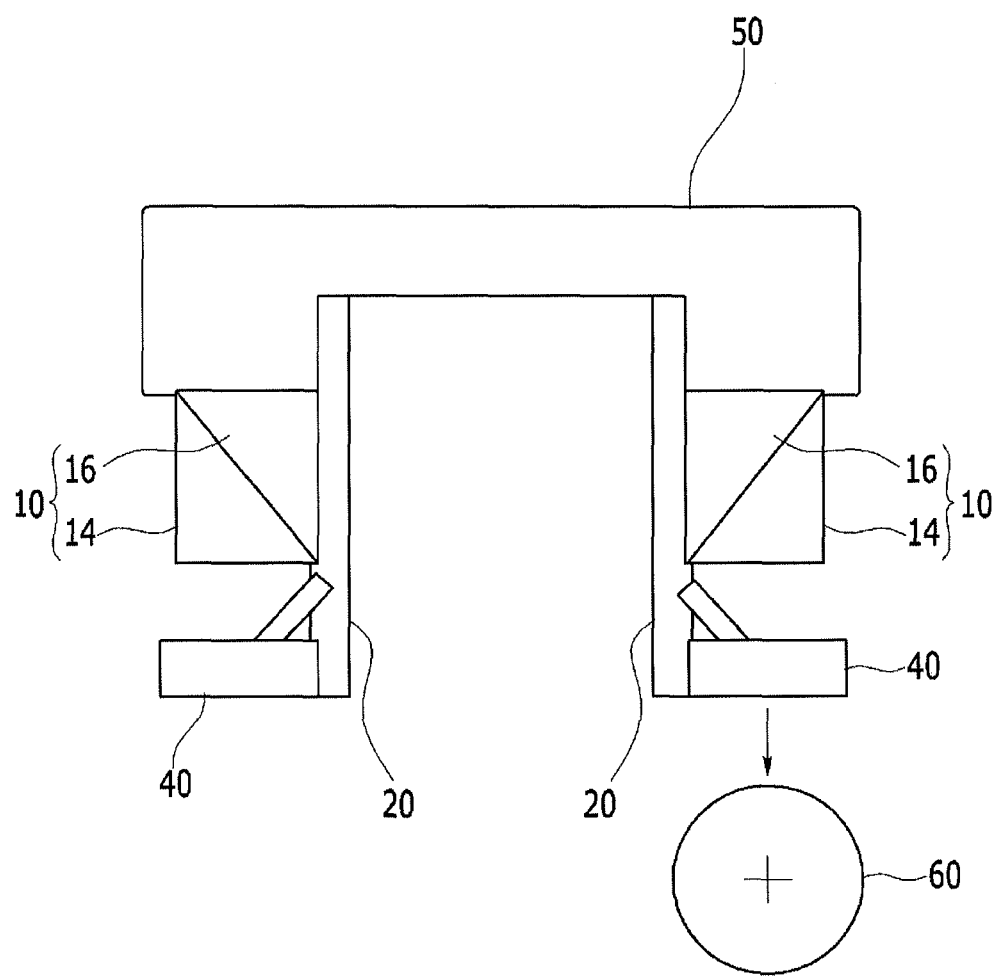
FIG. 3 shows a simplified model of a front vehicle body to which the exemplary shock absorber housing is mounted according to the present invention.

FIG. 3 shows a simplified model of a front vehicle body to which the shock absorber housing is mounted according to various embodiments of the present invention.

The shock absorber housing according to various embodiments of the present invention is mounted to an outer side in a width direction of the front side member 20 extended along a length direction of the vehicle and provided at the left and right sides of the vehicle along the width direction of the vehicle.

A front vehicle body structure 40 is provided at a front side of the front side member 20 along the length direction of the vehicle, and a middle vehicle body structure 50 such as a firewall that partitions an engine compartment and a cabin is provided at a rear side of the front side member 20 along the length direction of the vehicle.

Figure 4:
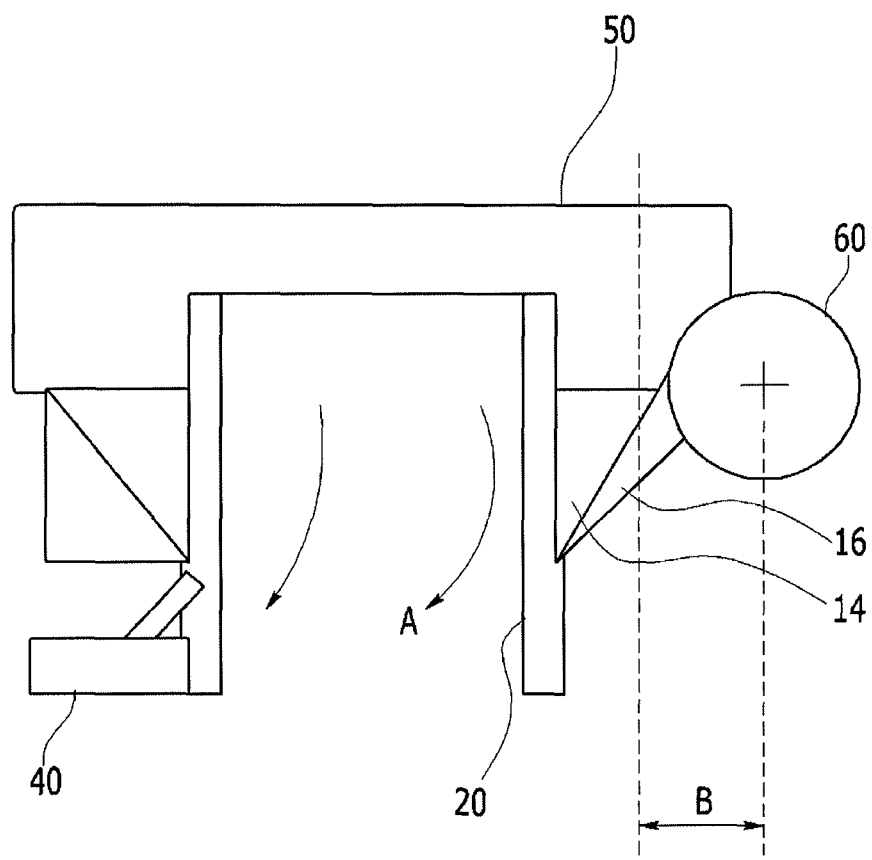
FIG. 4 shows a simplified model of a front vehicle body to which the exemplary shock absorber housing is mounted according to the present invention after a collision.

When the vehicle collides with a collision object 60 such as a barrier at a more outer side than the front side member 20 along the width direction of the vehicle (i.e., a small overlap collision), as shown in FIG. 4, the collision object 60 hits the low strength portion 14 of the shock absorber housing and thus the low strength portion 14 absorbs impact energy from the collision object 60 such that the impact energy is reduced.

When the small overlap collision is continued, the low strength portion 14 is compressively deformed toward the high strength portion 16 and then the collision object is turned aside to the outer side along the width direction of the vehicle by moving along an inclination direction of the high strength portion 16 due to high rigidity of the high strength portion 16, or a moment occurs in the vehicle along a clockwise direction with respect to the collision object 60 as shown in the arrow A in the drawing due to an impact force applied to the inclination direction of the high strength portion 16 such that the vehicle moves along the width direction.

That is, a relation displacement occurs by as much as a predetermined gap B between the vehicle and the collision object 60 compared to the initial collision portion in the width direction and thus continuous front collision between the vehicle and the collision object 60 can be prevented, and accordingly, small overlap front crash response performance of the vehicle can be improved, damage to the vehicle can be reduced, and a passenger can be more safely protected.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shock absorber housing of a vehicle, comprising:
a shock absorber housing body formed in a shape of a box; and
flanges formed along at least one of edges of the box-shaped shock absorber housing body and coupled to a vehicle body,
wherein the shock absorber housing body includes a low strength portion and a high strength portion that have different strengths due to a thickness difference, and
wherein the low strength portion is provided in an outer side of the vehicle in a width direction thereof with respect to the high strength portion.

2. The shock absorber housing of claim 1, wherein the low strength portion and the high strength portion are respectively formed in a shape of a quadrangle or a triangle.

3. The shock absorber housing of claim 1, wherein a thickness of the high strength portion is 2.5 times to 3.5 times a thickness of the low strength portion.

4. The shock absorber housing of claim 1, wherein the low strength portion and the high strength portion are connected to each other through an intermediate connection portion having variable strength along a width direction thereof.

5. The shock absorber housing of claim 4, wherein the intermediate connection portion has variable thickness between a thickness of the low strength portion and a thickness of the high strength portion.

6. The shock absorber housing of claim 4, wherein the intermediate connection portion is formed in a shape of an oblique line.

7. The shock absorber housing of claim 6, wherein an inclination angle of the oblique line is between 55° and 65°.

8. The shock absorber housing of claim 7, wherein the oblique line is inclined to an outer side of the vehicle along a width direction of the vehicle.

9. The shock absorber housing of claim 1, wherein the shock absorber housing body is formed of an aluminum material using a high-vacuum die-casting method.

10. A shock absorber housing mounting structure of a vehicle, in which one portion of the shock absorber housing of claim 1 is coupled to a front side member extended along a length direction of the vehicle, and another portion of the shock absorber housing is extended along the length direction of the vehicle, and is provided at an outer side along a width direction of the vehicle with respect to the front side member and is coupled to a fender apron upper member provided higher than the front side member with respect to a height direction of the vehicle.

11. A shock absorber housing of a vehicle, comprising:
a shock absorber housing body formed in a shape of a box; and
flanges formed along at least one of edges of the box-shaped shock absorber housing body and coupled to a vehicle body,
wherein the shock absorber housing body includes a low strength portion and a high strength portion that have different strengths due to a thickness difference, and
wherein the low strength portion and the high strength portion are respectively formed in a shape of a quadrangle or a triangle.

12. A shock absorber housing of a vehicle, comprising:
a shock absorber housing body formed in a shape of a box; and
flanges formed along at least one of edges of the box-shaped shock absorber housing body and coupled to a vehicle body,
wherein the shock absorber housing body includes a low strength portion and a high strength portion that have different strengths due to a thickness difference, and
wherein the low strength portion and the high strength portion are connected to each other through an intermediate connection portion having variable strength along a width direction thereof.

13. The shock absorber housing of claim 12, wherein the intermediate connection portion has variable thickness between a thickness of the low strength portion and a thickness of the high strength portion.

14. The shock absorber housing of claim 12, wherein the intermediate connection portion is formed in a shape of an oblique line.

15. The shock absorber housing of claim 14, wherein an inclination angle of the oblique line is between 55° and 65°.

16. The shock absorber housing of claim 15, wherein the oblique line is inclined to an outer side of the vehicle along a width direction of the vehicle.

* * * * *